United States Patent [19]

Potter et al.

[11] Patent Number: 4,930,759
[45] Date of Patent: Jun. 5, 1990

[54] CUTTING BOARD

[76] Inventors: Arthur C. Potter, 30 Brisbane House, The Fairway, Midhurst, West Sussex, GU29 9JE; Deborah J. M. Eeles, "Treetops", Upper Springfield, Elstead, Surrey, GU8 6EQ, both of England

[21] Appl. No.: 355,463

[22] Filed: May 23, 1989

[30] Foreign Application Priority Data

May 25, 1988 [GB] United Kingdom ................ 8812435
Feb. 20, 1989 [GB] United Kingdom ................ 8903834

[51] Int. Cl.⁵ .............................................. B23Q 3/00
[52] U.S. Cl. .............................. 269/54.5; 269/289 R; 269/302.1
[58] Field of Search ............. 269/54.4, 54.5, 289, 269/291, 286, 302.1, 900, 13, 14, 16

[56] References Cited

U.S. PATENT DOCUMENTS

| 2,751,951 | 6/1956 | Strathaus | 269/54.5 |
| 2,935,107 | 5/1960 | Bertelsen et al. | 269/289 |
| 3,030,944 | 4/1962 | Wysowski | 269/54.5 |
| 3,976,288 | 8/1976 | Cuomo | 269/291 |
| 3,995,844 | 12/1976 | Hellman | 269/54.5 |
| 4,186,916 | 2/1980 | Varga | 269/303 |
| 4,497,477 | 2/1985 | Abel | 269/900 |
| 4,653,737 | 3/1987 | Haskins et al. | 269/289 R |
| 4,798,372 | 1/1989 | Tingle | 269/289 R |

FOREIGN PATENT DOCUMENTS

| 193617 | 3/1923 | United Kingdom . |
| 242375 | 11/1925 | United Kingdom . |
| 404752 | 1/1934 | United Kingdom . |
| 501231 | 2/1939 | United Kingdom . |
| 683999 | 12/1952 | United Kingdom . |
| 795423 | 5/1958 | United Kingdom . |
| 1094661 | 12/1967 | United Kingdom . |
| 1229150 | 4/1971 | United Kingdom . |
| 2032768 | 5/1980 | United Kingdom . |
| 381987 | 10/1982 | United Kingdom . |
| 1054095 | 5/1989 | United Kingdom . |

Primary Examiner—Robert C. Watson
Attorney, Agent, or Firm—Cushman, Darby & Cushman

[57] ABSTRACT

A cutting board for use in the cutting of bread, roasted meat and like foodstuffs comprises a baseboard having a plurality of depressions in a surface thereof for the temporary retention of food debris, a platform having retaining means to inhibit movement of food placed thereon, guide means for guiding the blade of a knife during the cutting operation, and a stop for locating food to be sliced in a desired position relative to the guide means thereby to determine the thickness of slice to be cut from the food, wherein the platform, guide means and stop are each removably mountable on the baseboard.

14 Claims, 4 Drawing Sheets

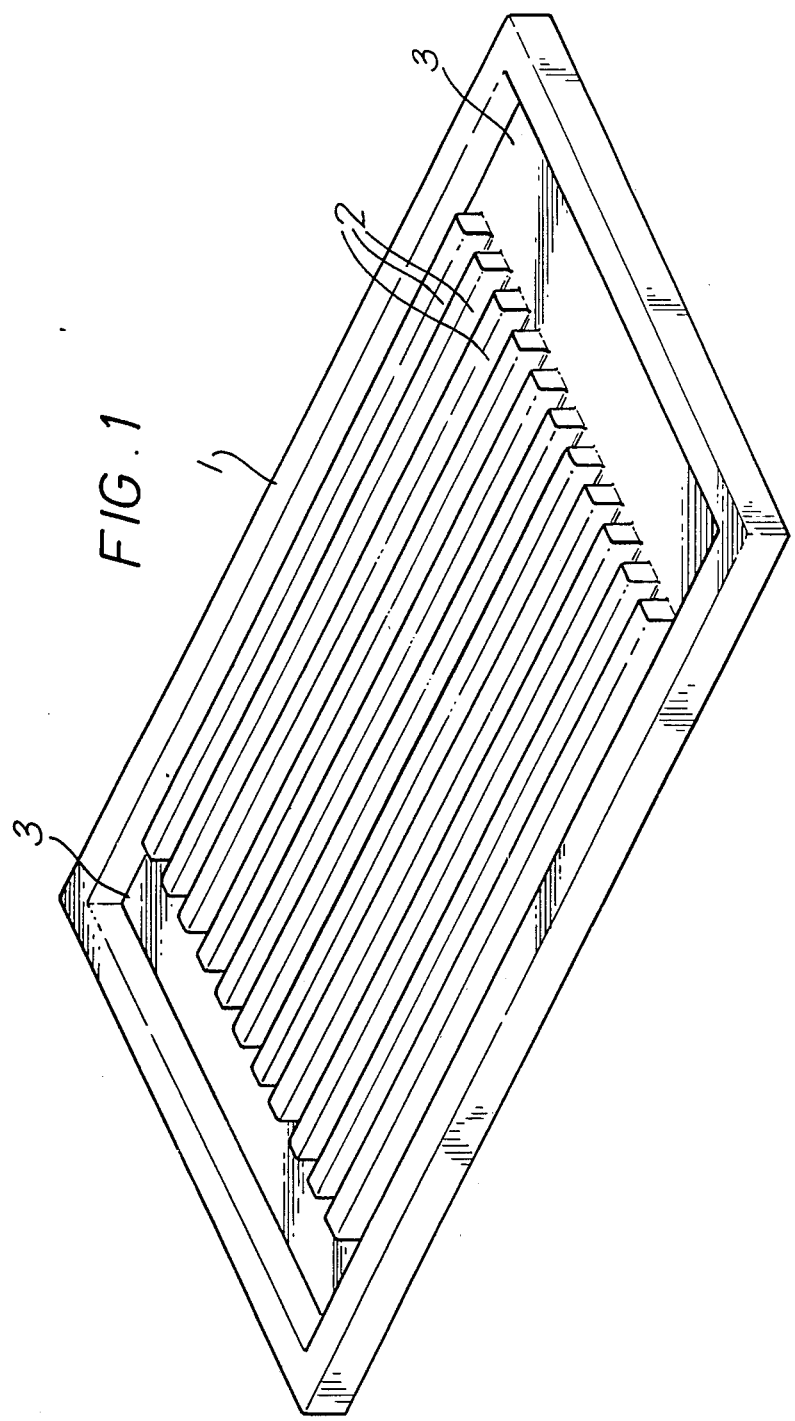

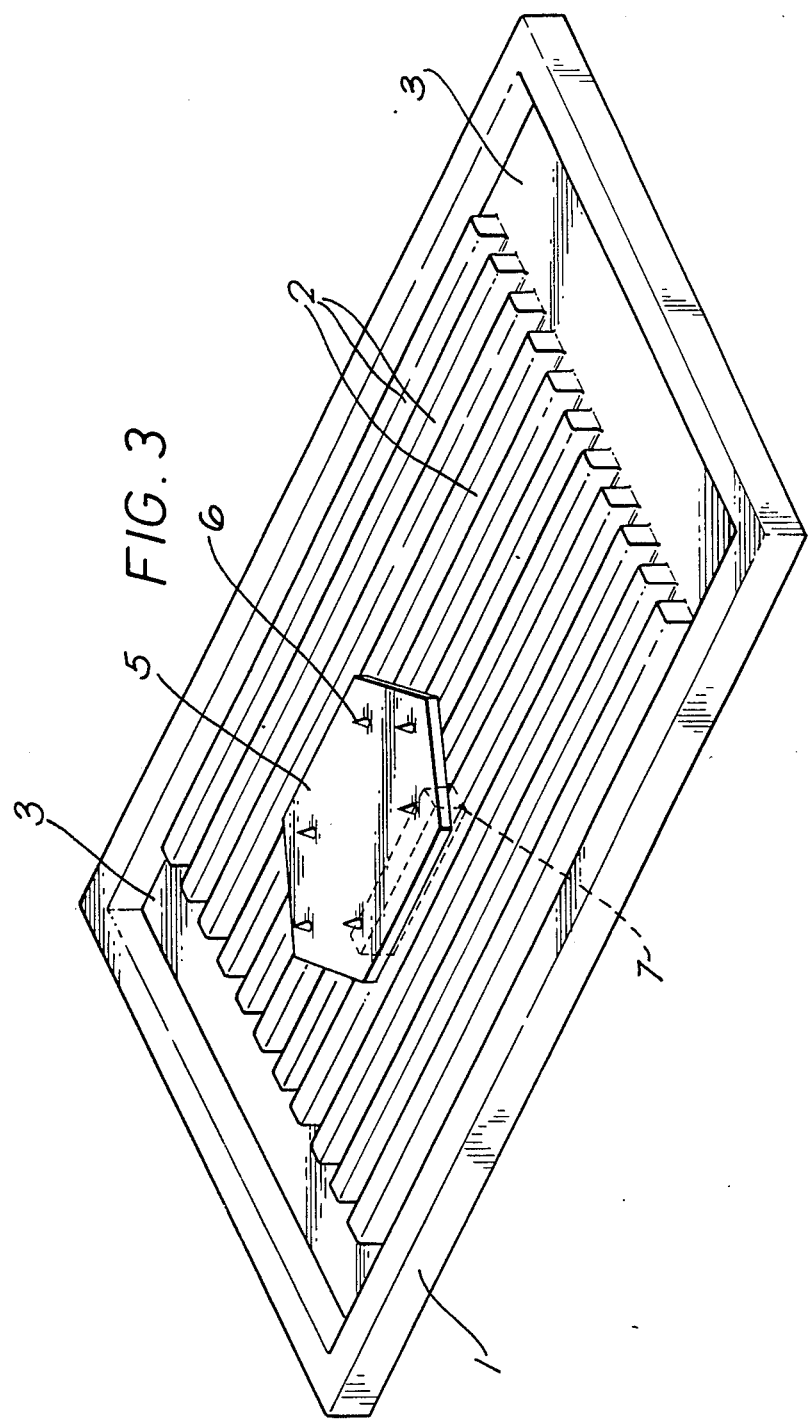

CUTTING BOARD

The present invention relates to a cutting board for use in the cutting of bread, roasted meat and like foodstuffs.

According to the present invention there is provided a cutting board for use in the cutting of bread, roasted meat and like foodstuffs comprising: a baseboard having a surface for supporting the food during the cutting operation, the said surface being provided with a plurality of depressions for the temporary retention of food debris, and a platform having retaining means to inhibit movement of food placed thereon, wherein the platform is removably mountable on the baseboard and is provided with means for the location thereof on the said surface of the baseboard.

In preferred embodiments, the said location means comprises a plurality of projections on an under-surface of the platform which projections are adapted to be received by the said depressions in the baseboard.

Preferably, the arrangement of the depressions in the surface of the baseboard is such that the platform may be removably mounted on the baseboard in a variety of different positions. For example, in preferred embodiments, each of the said depressions comprises an elongate channel which extends along the length of the baseboard so that the longitudinal position of the platform is continuously variable along the length of the said channels. The provision of depressions in the form of elongate channels facilitates drainage of, for example, juice from roasted meat in use.

It is further preferred that corresponding ends of respective elongate channels open into a common depressed region at each end of the baseboard. The said depressed regions are provided both for accumulation of food debris therein and to facilitate cleaning of the baseboard after use.

Also in such embodiments, it is preferred that the said projections on the under-surface of the platform are such as to provide relief channels to allow drainage of, for example, juices from roasted meat along the elongate channels in the baseboard when the projections are received by the said channels.

The said retaining means on the platform may comprise a plurality of upwardly directed spikes for engagement with food placed on the platform.

To further improve drainage from food on the platform, the platform may have at least one hole through the surface thereof. For example, the said spikes may be positioned towards the outer perimeter of the platform, the central portion of the platform being cut away.

In some embodiments, a cutting board according to the invention may further comprise guide means for guiding the blade of the knife during slicing of food, and a stop for locating food to be sliced in a desired position relative to the guide means thereby to determine the thickness of slice to be cut from the food, wherein the guide means and the stop are each removably mountable on the baseboard and wherein each of the guide means and the stop are provided with means for the location thereof on the said surface of the baseboard.

The said location means provided on each of the guide means and the stop may comprise a portion or portions of the guide means and stop respectively which portions are adapted to be received by the said depressions in the baseboard.

Preferably, the guide means has a substantially planar end surface for guiding the blade of a knife and a lateral surface for abutment with food to be sliced in use. The guide means thus serves as alignment means for the alignment of a knife.

In preferred embodiments, the guide means and the stop each have a generally arched cross section when mounted on the baseboard and are adapted to be collapsible on removal from the baseboard for convenience of storage.

The guide means and stop may be adapted to be collapsible as aforesaid by the provision on each of the guide means and stop of at least one hinge. Preferably, the said at least one hinge is integrally formed with the guide means and stop respectively.

In preferred embodiments, the reverse surface of the baseboard is substantially planar to provide an alternative cutting surface. The platform, guide means, stop and baseboard may be made of any convenient hard-wearing material, but are preferably moulded from a synthetic polymer, for example a polyolefin. In preferred embodiments the platform, guide means, stop and the baseboard are made of polypropylene.

Preferred embodiments of the invention will now be described by way of example with reference to the accompanying drawings in which:

FIG. 1 is a perspective view of a baseboard according to the invention;

FIG. 2b is a perspective view of the under-surface of the platform of FIG. 2a;

FIG. 3 shows a cutting board embodying the invention comprising the baseboard of FIG. 1 with the platform of FIGS. 2a and 2b mounted thereon;

FIG. 1 shows a rectangular baseboard 1 having a plurality of depressions in the form of elongate channels 2 in a surface thereof. The channels 2 are substantially mutually parallel and extend over most of the length of the baseboard 1. Corresponding ends of respective elongate channels 2 open into a common depressed region 3 at either end of the baseboard 1.

Figure 2A:
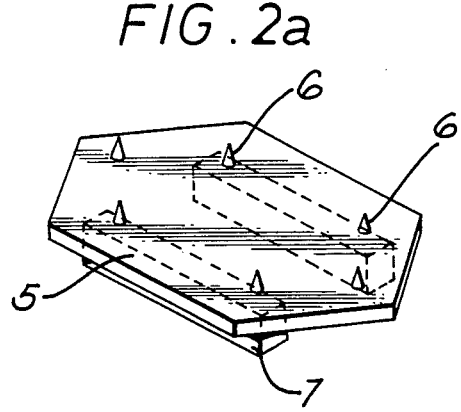
FIG. 2a is a perspective view of the upper surface of a platform according to the invention.
Figure 2B:
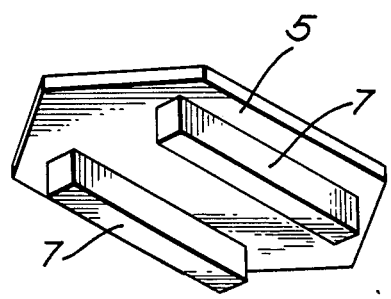

FIG. 2A shows a platform 5 according to the invention having retaining means in the form of upwardly directed spikes 6 to inhibit movement of food placed on the platform in use. The under-surface of the platform, as shown in FIG. 2b, is provided with location means comprising a plurality of projections in the form of two rectangular blocks 7. The dimensions of the blocks 7 are such as to allow sliding reception of the blocks 7 in any of the elongate channels 2 shown in FIG. 1.

FIG. 3 shows a cutting board embodying the invention comprising the baseboard 1 with the platform 5 removably mounted thereon by reception of the blocks 7 on the under-surface of the platform in respective elongate channels 2 in the baseboard.

Figure 4:
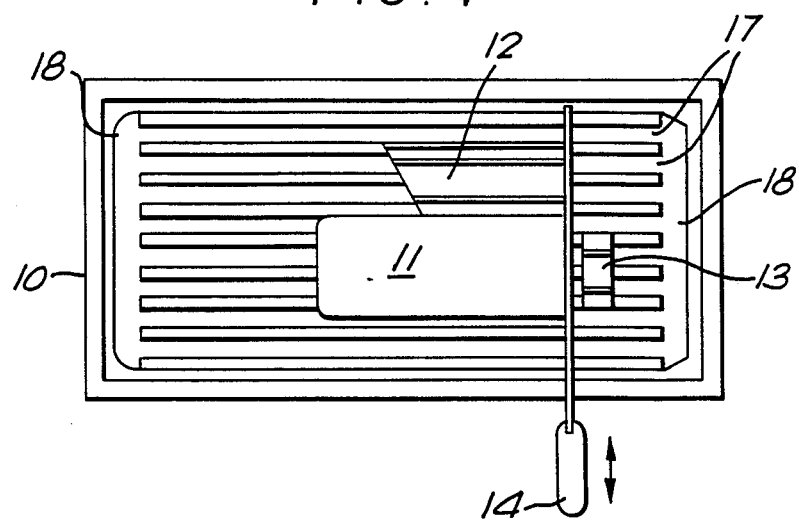
FIG. 4 is a plan view of an alternative form of cutting board comprising a baseboard with guide means and a stop mounted thereon.

FIG. 4 shows an alternative form of baseboard 10 having a plurality of depressions in the form of substantially mutually parallel elongate channels 17 in a surface thereof. As in the embodiment of FIG. 3, corresponding ends of respective channels 17 open into a common depressed region 18 at either end of the baseboard. Guide means 12 are shown mounted on the board 18 for guiding the blade of a knife 14 during cutting of, for example, a loaf of bread 11 which is positioned so as to abut a lateral surface of the guide means 12. The end surface of the guide means 12 which abuts the blade of the knife 14 is substantially planar. A stop 13 is also shown mounted on the baseboard 10, which stop is suitably positioned relative to the guide means 12 to abut an end of the loaf of bread 11 during the cutting operation, thereby to determine the thickness of the slice to be cut from the loaf.

Figure 5:
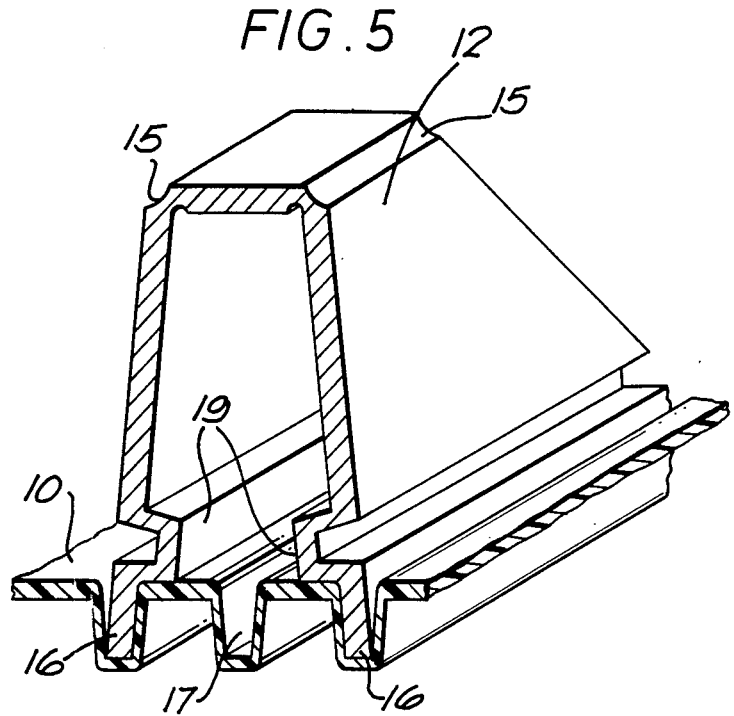
FIG. 5 is a diagrammatic cross-section through the guide means and baseboard of FIG. 4.

FIG. 5 is a diagrammatic cross-section through the guide means 12 and part of the baseboard 10 of FIG. 4. The guide means 12 has a generally arched cross-section, and is provided with two hinges in the form elongate constrictions 15 along the upper edges thereof. Location means in the form of the portions 16 of the guide means 12 are received by respective elongate channels 17, thereby locating the guide means 12 on the baseboard 10. Rectangular abutments 19 abut the surface of the baseboard 10 to stabilise the guide means 12 relative to the baseboard. When removed from the baseboard, the guide means 12 may be collapsed for convenience of packing and storage by pivoting of the sides of the guide means 12 about the hinges 15.

When mounted on the baseboard 10 the height of the guide means 12 is comparable to the height of the loaf of bread 11.

The cross-section of the stop 13 shown in FIG. 4 is exactly similar to that of the guide means 12, except that the height of the stop 13 when mounted on the board may be substantially less than that of the guide means 12.

To use the cutting board in the cutting of, for example, a joint of meat, the platform 5 is mounted in an appropriate position on the baseboard 1 as shown in FIG. 3. The joint of meat is then placed on the platform 5 so that at least some of the spikes 6 engage with the meat to inhibit movement thereof during cutting. As the meat is then cut, juices from the meat drain from the platform 5 into the elongate channels 2 and thereby into the depressed regions 3 at either end of the baseboard. Small pieces of food which fall from the platform during cutting are also retained in the depressions 2, 3.

In some embodiments, drainage from the platform 5 may be improved by the provision of a hole or holes (not shown) through the surface of the platform 5. For example, the spikes 6 may be positioned as shown towards the outer perimeter of the platform 5, and the central portion of the platform 5 may be cut away. In addition, the projections 7 along the under-surface of the platform 5 may be such as to provide relief channels to allow drainage along the elongate channels 2 in the board 1 when the projections 7 are received by the said channels. For example, the depth of the blocks 7 may be less than the depth of the elongate channels 2, so as to provide the said relief channels on insertion of the blocks 7 into the channels 2.

If it is desired to use the cutting board in the slicing of, for example, a loaf of bread, the guide means 12 and stop 13 are mounted on the baseboard 10 as shown in FIG. 4. The loaf of bread 11 is then placed on the baseboard 10 so that a side thereof abuts a lateral surface of the guide means 12 as shown in the figure. The loaf 11 is then moved relative to the guide means 12 so that the end of the loaf from which a slice is to be cut abuts the stop 13. The perpendicular distance between the stop 13 and the end of the guide means 12 thus determines the thickness of the slice to be cut from the loaf. An operator then aligns the blade of a knife 14 with the planar end surface of guide means 12 and slices the bread 11 keeping the blade of the knife 14 in contact with the said end surface. When the slice of bread has been removed, the loaf 11 is then re-positioned so that it again abuts stop 13 and the bread is then sliced as before.

It will be appreciated that, providing the relative positions of the guide means 12 and stop 13 are not changed, successive slices will be of equal thickness. The thickness of the slice may of course be varied simply by re-positioning the guide means 12 and/or the stop 13 on the baseboard 10.

Although the use of the platform 5 and the guide means 12 and stop 13 have been described with reference to alternative embodiments of the baseboard 1, 10 it is preferred that the platform 5, guide means 12 and stop 13 are removably mountable on a common baseboard.

It will be appreciated that the baseboard 1, 10 may be used on its own in the manner of an ordinary cutting board. In addition, the reverse surface of the baseboard 1, 10 may be substantially flat to provide an alternative cutting surface.

The board 1, platform 5, guide means 12 and stop 13 may be made of any convenient hardwearing material, for example polypropylene. In addition, the baseboard 1, 10 may be provided with a frame (not shown) extending around the outer perimeter of the board. Such a frame, which may be made of, for example, wood, may be provided with a chamfered upper and/or lower edge to facilitate the picking up of the baseboard from a flat surface.

It will be appreciated that many other variations and modifications may be made to the specific embodiments described above without departing from the scope of the invention as defined by the following claims.

We claim:

1. A cutting board for use in the cutting of bread, roasted meat and like foodstuffs comprising:
   a baseboard having a surface for supporting the food during the cutting operation, the said surface being provided with a plurality of depressions comprising elongate channels for the temporary retention of food debris, and
   a platform having retaining means to inhibit movement of food placed thereon, wherein
   the platform is removably mountable on the baseboard and is provided with location means for the location thereof on the said surface of the baseboard, the said location means comprising a plurality of projections on an under-surface of the platform which projections are adapted to be received by the said channels for temporary retention of food debris in the baseboard.

2. A cutting board as claimed in claim 1 wherein each of the said elongate channels extends along most of the length of the baseboard.

3. A cutting board as claimed in claim 2 wherein corresponding ends of respective elongate channels open into a common depressed region at each end of the baseboard.

4. A cutting board as claimed in claim 2 wherein the said projections on the under-surface of the platform are such as to provide relief channels to allow passage of food debris along the elongate channels in the baseboard when the projections are received by the said channels.

5. A cutting board as claimed in claim 1 wherein the said retaining means on the platform comprises a plurality of upwardly directed spikes for engagement with food placed on the platform.

6. A cutting board as claimed in claim 1 wherein the platform has at least one hole through the surface thereof for passage of food debris.

7. A cutting board as claimed in claim 1 wherein the reverse surface of the baseboard is substantially planar.

8. A cutting board as claimed in claim 1 wherein the baseboard and the platform are made of polypropylene.

9. A cutting board as claimed in claim 1 further comprising guide means for guiding the blade of the knife during slicing of food, and a stop for locating food to be sliced in a desired position relative to the guide means thereby to determine the thickness of slice to be cut from the food, wherein the guide means and the stop are each removably mountable on the baseboard and are each provided with means for the location thereof on the said surface of the baseboard.

10. A cutting board as claimed in claim 9 wherein the said location means provided on the guide means and the stop comprise a portion or portions of the guide means and stop respectively, which portions are adapted to be received by the said depressions in the baseboard.

11. A cutting board as claimed in claim 9 wherein the guide means has a substantially planar end surface for guiding the blade of a knife and a lateral surface for abutment with food to be sliced in use.

12. A cutting board as claimed in claim 9 wherein the guide means and the stop each have a generally arched cross-section when mounted on the baseboard and are adapted to be collapsible on removal from the baseboard.

13. A cutting board as claimed in claim 12 wherein the guide means and stop are each provided with at least one hinge integrally formed therewith such that the guide means and the stop are collapsible on removal from the baseboard.

14. A cutting board as claimed in claim 9 wherein the guide means and the stop are made of polypropylene.

* * * * *